(12) United States Patent
Onishi et al.

(10) Patent No.: US 10,412,578 B2
(45) Date of Patent: Sep. 10, 2019

(54) DISTRIBUTED DATA PROCESSING SYSTEM, CENTER SERVER, EDGE SERVER, MOBILE TERMINAL, AND METHOD

(71) Applicant: TOYOTA JIDOSHA KABUSHIKI KAISHA, Toyota-shi, Aichi-ken (JP)

(72) Inventors: Ryokichi Onishi, Tokyo (JP); Masaaki Sasahara, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/822,032

(22) Filed: Nov. 24, 2017

(65) Prior Publication Data
US 2018/0160299 A1 Jun. 7, 2018

(30) Foreign Application Priority Data

Dec. 6, 2016 (JP) ................................ 2016-236724

(51) Int. Cl.
*H04W 8/24* (2009.01)
*H04W 4/04* (2009.01)

(52) U.S. Cl.
CPC ............ *H04W 8/24* (2013.01); *H04W 4/046* (2013.01)

(58) Field of Classification Search
CPC ................................ H04W 8/24; H04W 4/046
USPC ......................................................... 455/419
See application file for complete search history.

(56) References Cited

U.S. PATENT DOCUMENTS

| 5,699,056 A | 12/1997 | Yoshida | |
|---|---|---|---|
| 2008/0076450 A1 | 3/2008 | Nanda et al. | |
| 2010/0311415 A1* | 12/2010 | Hamabe | H04W 24/02 455/425 |
| 2012/0315949 A1* | 12/2012 | Zhang | H04W 24/08 455/525 |
| 2016/0046237 A1 | 2/2016 | Sugimoto et al. | |
| 2017/0205534 A1* | 7/2017 | Prikryl | G01C 5/00 |
| 2017/0215064 A1 | 7/2017 | Onishi et al. | |
| 2017/0245197 A1* | 8/2017 | Onishi | H04W 4/046 |

(Continued)

FOREIGN PATENT DOCUMENTS

| JP | H08-263783 A | 10/1996 |
|---|---|---|
| JP | 2002-026802 A | 1/2002 |
| JP | 2005-333225 A | 12/2005 |

(Continued)

*Primary Examiner* — Kamran Afshar
*Assistant Examiner* — Farid Seyedvosoghi
(74) *Attorney, Agent, or Firm* — Oliff PLC

(57) ABSTRACT

An information request describing an attribute of necessary data is distributed from a center server to a mobile terminal via an edge server; the mobile terminal transmits data, which is requested in the information request, to the edge server; the edge server notifies the center server to the effect that the data, which is requested in the information request, has been acquired; the center server distributes, with respect to data acquired by the edge server from the mobile terminal, non-necessity information indicating that collection of the data is unnecessary to the edge server and to the mobile terminal via the edge server; and when the mobile terminal receives the non-necessity information, the mobile terminal suspends acquisition of data, of which collection is deemed unnecessary in the non-necessity information, and, when the data is stored, discards the data.

13 Claims, 9 Drawing Sheets

(56) References Cited

U.S. PATENT DOCUMENTS

2017/0289752 A1    10/2017    Onishi et al.

FOREIGN PATENT DOCUMENTS

| JP | 2008-242936 A | 10/2008 |
| JP | 2011-75474 A | 4/2011 |
| JP | 2013-34210 A | 2/2013 |
| JP | 2015-007923 A | 1/2015 |
| JP | 2016-025463 A | 2/2016 |
| JP | 2016-76911 A | 5/2016 |
| JP | 2016-109650 A | 6/2016 |
| WO | 2014/167701 A1 | 10/2014 |

* cited by examiner

DISTRIBUTED DATA PROCESSING SYSTEM, CENTER SERVER, EDGE SERVER, MOBILE TERMINAL, AND METHOD

BACKGROUND OF THE INVENTION

Field of the Invention

The present invention relates to a distributed data processing system which collects data from a mobile terminal using an edge server.

Description of the Related Art

In recent years, the collection and utilization of data from traveling vehicles are being studied. For example, a system is being considered which generates map data by collecting, in a data center, three-dimensional point group data measured using a laser scanner (also referred to as light detection and ranging: LIDAR) mounted to a vehicle. Since an amount of the three-dimensional point group data is enormous, data collection is desirably carried out in an efficient manner.

Japanese Patent Application Laid-open No. 2013-34210 proposes sharing and integrating sensor information between terminals using broadcast communication. According to Japanese Patent Application Laid-open No. 2013-34210, by sharing and integrating information between terminals in this manner, map information of the neighborhood can be generated and updated without communicating with a center server.

Japanese Patent Application Laid-open No. 2011-75474 proposes exchanging sensor information between terminals based on information such as a request position of a terminal and a vehicle attribute.

With the method according to Japanese Patent Application Laid-open No. 2013-34210, since transmission data is not specified, sensor information is constantly sent to a center server. Therefore, the transmission of redundant information gives rise to a concern that a load on a cellular line or a processing load on the center server may increase.

While Japanese Patent Application Laid-open No. 2011-75474 describes that a position and an attribute of information to be requested can be specified, since no consideration is given to suspending the exchange of sensor information once information is obtained, unnecessary collection and transmission of information ends up being performed.

Patent Document 1: Japanese Patent Application Laid-open No. 2013-34210
Patent Document 2: Japanese Patent Application Laid-open No. 2011-75474
Patent Document 3: Japanese Patent Application Laid-open No. 2016-76911

SUMMARY OF THE INVENTION

The present invention has been made in consideration of the problems described above and an object thereof is to reduce communication load and perform information collection in an efficient manner when collecting data from a mobile terminal.

An aspect of the present invention is a distributed data processing system including a center server, a plurality of edge servers, and a mobile terminal, and collecting, in the center server, data acquired by the mobile terminal.

In the present aspect, the center server may distribute an information request describing an attribute of at least one piece of necessary data to the mobile terminal via an edge server. While requested data may be of any type, the requested data may be data obtained by a measurement performed by the mobile terminal. Examples of such data include point group data obtained by a laser scanner (LIDAR) measurement. An attribute of data may be any attribute as long as a type of necessary data can be identified. An example of an attribute of data is an acquisition position of the data.

In the present aspect, the mobile terminal may transmit requested data, which is requested in the information request, to the edge server. The mobile terminal may acquire and transmit the requested data after receiving the information request or may transmit information in the possession of the mobile terminal upon receiving the information request.

In the present aspect, when the edge server receives data from the mobile terminal or another apparatus, the edge server ma notify the center server to the effect that the requested data has been acquired. At this point, the fact that the edge server possesses data need only be conveyed to the center server, and the data itself may or may not be transmitted to the center server.

In the present aspect, with respect to data acquired by the edge server from the mobile terminal, the center server may distribute non-necessity information indicating that collection of the data is unnecessary to the edge server and to the mobile terminal via the edge server. In other words, the center server may transmit the non-necessity information to the edge server and the edge server may transmit the non-necessity information to the mobile terminal.

In the present aspect, when the mobile terminal receives the non-necessity information, the mobile terminal may suspend acquisition of unnecessary data, of which collection is deemed unnecessary in the non-necessity information, and, discards the data if the data is stored in the mobile terminal.

According to the configuration described above, both a processing load and a memory load on the mobile terminal can be reduced at a time point where data requested by the center server is transmitted to any of the edge servers and the data becomes usable by the center server. In addition, since redundant data transmission from the mobile terminal to the edge server can also be avoided, communication efficiency is also improved.

In the present aspect, after the edge server acquires and integrates a prescribed number of pieces of data having an attribute deemed necessary in the information request, the edge server may notify the center server to the effect that the requested data has been acquired. For example, data integration can be performed by applying a statistical process such as averaging on data. When the data is point group data, for example, a voxel grid filter can be applied.

By performing data integration in this manner, value or reliability of information can be improved and, at the same time, an increase in data amount can be suppressed. In addition, performing the integration process with the edge server enables processing in the system to be distributed.

In the present aspect, in a similar manner, after the mobile terminal acquires and integrates a prescribed number of pieces of data having an attribute deemed necessary in the information request, the mobile terminal may transmit the integrated data to the edge server. By performing data integration with the mobile terminal, a communication amount between the mobile terminal and the edge server can be reduced. This method is effective when a large number of pieces of data having the same attribute can be acquired by the mobile terminal.

Data integration by the edge server and data integration by the mobile terminal can both be performed. In this case, the "prescribed number" with respect to the edge server is favorably set equal to or greater than the "prescribed number" with respect to the mobile terminal. The values of these "prescribed numbers" may be transmitted included in an information request by the center server or may be determined in advance as system settings.

In the present aspect, a hierarchical structure may be defined among a plurality of mobile terminals and an information request can be distributed to a downstream side, requested data can be transmitted to an upstream side, and non-necessity information can be distributed to the downstream side. Specifically, the mobile terminal may determine, in accordance with a prescribed criterion, which of the mobile terminal and other mobile terminals are on the upstream side and which are on the downstream side, distribute, to the other mobile terminal on the downstream side, the information request and the non-necessity information distributed from the edge server or the other mobile terminal on the upstream side, when the information request is acquired from the other mobile terminal on the upstream side, transmit requested data to the edge server or the other mobile terminal on the upstream side, and when the non-necessity information is acquired, discard data, of which collection is deemed unnecessary in the non-necessity information, if the data is stored.

While an upstream-downstream relationship among mobile terminals may be determined based on any criterion, a mobile terminal "close" to the edge server may be defined as being on the upstream side. "Closeness" as used herein need not necessarily be determined based on a physical distance, and a case where the number of hops to the edge server is small, a case where there are many communication opportunities with the edge server, a case where the time required until communication is established with the edge server is short, and the like may be defined as being "close" to the edge server.

In the present aspect, the edge server may also be configured so as to have a plurality of hierarchical structures.

In the present aspect, the data may be point group data obtained by a laser scanner measurement, and the information request may include a measurement position of the point group data as an attribute of necessary data. Since a data amount of point group data obtained by a laser scanner measurement is large, a reduction of the data amount due to an integration process is particularly effective.

An example of the mobile terminal according to the present aspect is a vehicle-mounted terminal that is mounted to a vehicle. "Mounted to a vehicle" as used herein includes, in addition to being installed in a vehicle, a portable terminal being carried into a vehicle.

Another aspect of the present invention is a center server. The center server according to the present aspect is
- an information request distributing unit adapted to distribute an information request describing an attribute of at least one piece of necessary data to the mobile terminal via the edge server;
- a receiving unit adapted to receive, from the edge server, a notification to the effect that the edge server possesses requested data, which is requested in the information request; and
- a non-necessity information distributing unit adapted to distribute, in response to the reception of the notification to the effect that the edge server possesses the requested data, non-necessity information indicating that collection of the requested data is unnecessary to the edge server and to the mobile terminal via the edge server.

Another aspect of the present invention is an edge server. The edge server according to the present aspect is
- an edge server collecting data from a mobile terminal in accordance with an information request from a center server, the edge server including:
- an information request receiving unit adapted to receive an information request describing an attribute of at least one piece of necessary data from the center server;
- an information request transmitting unit adapted to transmit the information request to the mobile terminal;
- an information receiving unit adapted to receive requested data, which is requested in the information request from the mobile terminal;
- a possession notification transmitting unit adapted to notify the center server to the effect that the requested data has been acquired;
- a non-necessity information receiving unit adapted to receive non-necessity information indicating that collection of the requested data is unnecessary from the center server; and
- a non-necessity information transmitting unit adapted to transmit the non-necessity information to the mobile terminal.

Another aspect of the present invention is a mobile terminal. The mobile terminal according to the present aspect includes:
- an information request receiving unit adapted to receive an information request describing an attribute of at least one piece of necessary data from an edge server;
- a data acquiring unit adapted to acquire requested data, which is requested in the information request;
- an information transmitting unit adapted to transmit the requested data to the edge server; and
- a non-necessity information receiving unit adapted to receive non-necessity information indicating that collection of the requested data from a center server,
- wherein when the non-necessity information is received, acquisition of the unnecessary data, of which collection is deemed unnecessary in the non-necessity information, is suspended, and the data is discarded if the data is stored.

Another aspect of the present invention is a data collection method in a distributed data processing system including a center server, a plurality of edge servers, and a mobile terminal, and collecting, in the center server, data acquired by the mobile terminal, the data collection method including:
- distributing, by the center server, an information request describing an attribute of at least one piece of necessary data to the mobile terminal via an edge server;
- transmitting, by the mobile terminal, requested data which is requested in the information request to the edge server;
- notifying, by the edge server, the center server to the effect that the requested data has been acquired;
- distributing, by the center server, with respect to the data acquired by the edge server from the mobile terminal, non-necessity information indicating that collection of the data is unnecessary to the edge server and to the mobile terminal via the edge server; and
- in response to receiving the non-necessity information, suspending, by the mobile terminal, acquisition of unnecessary data, of which collection is deemed unnecessary in the non-necessity information, and discard the data if the data is stored.

According to the present disclosure, in a distributed data processing system, a communication load can be reduced and information collection can be carried out in an efficient manner when collecting data from a mobile terminal.

DESCRIPTION OF THE EMBODIMENTS

First Embodiment

<System Configuration>

The present embodiment is a multi-stage distributed data processing system which efficiently collects environmental structure information (point group data) obtained from a sensor (a laser scanner) mounted to a vehicle in a data center to generate a three-dimensional map.

Figure 1:
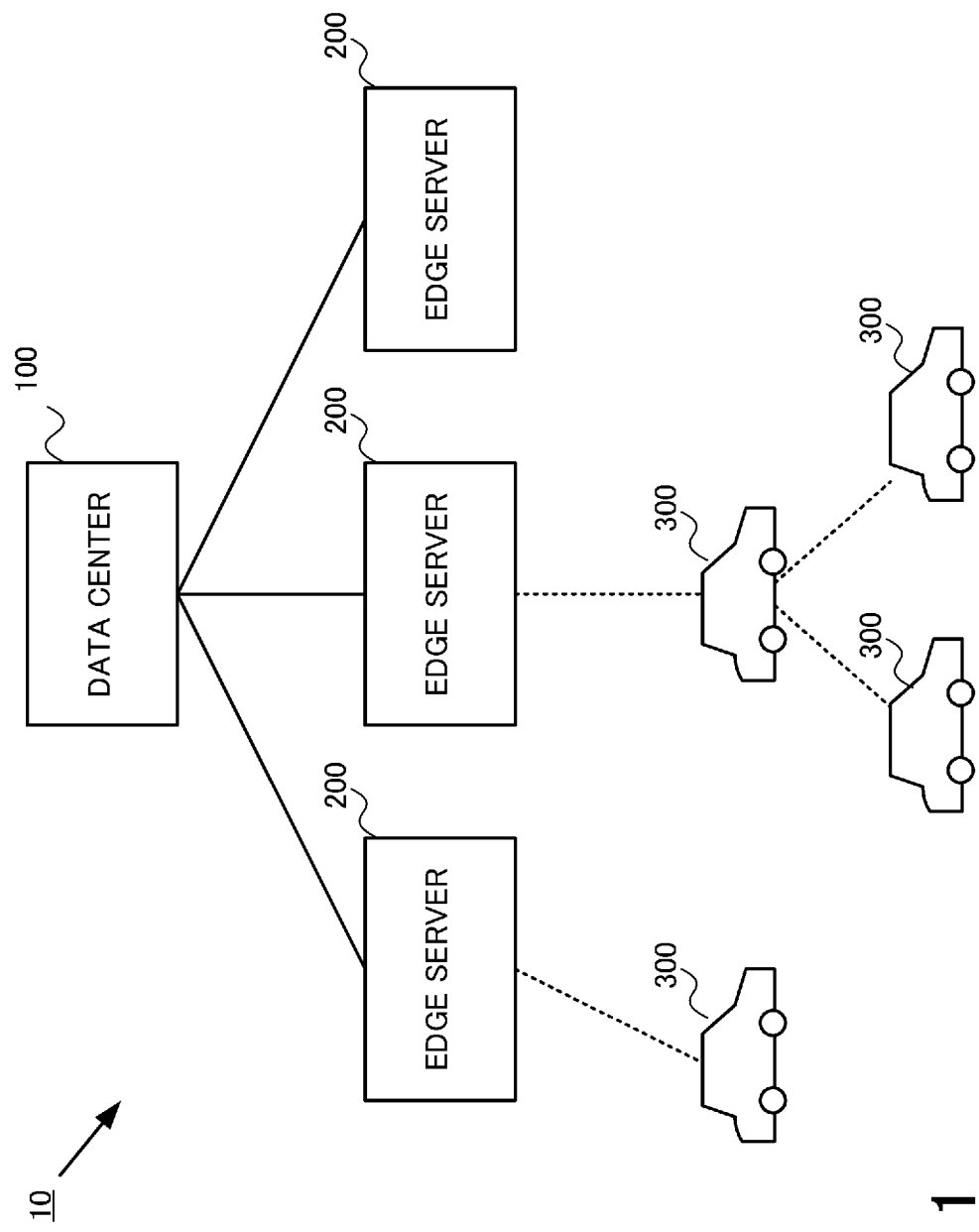
FIG. 1 is a diagram showing a general configuration of a multi-stage distributed data processing system according to an embodiment.
Figure 2:
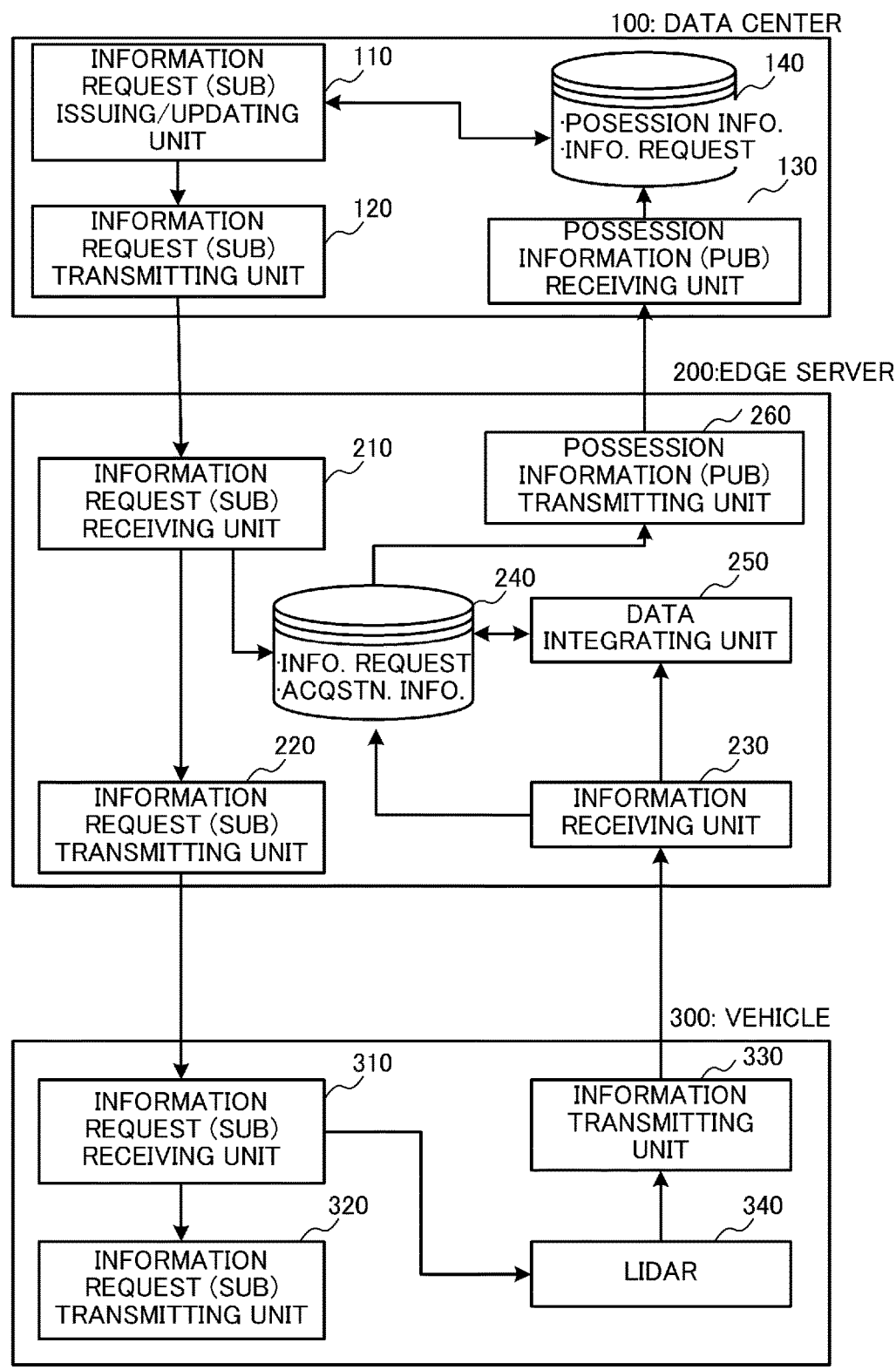
FIG. 2 is a diagram showing functional blocks of a multi-stage distributed data processing system according to an embodiment.

FIG. 1 is a diagram showing a general configuration of a multi-stage distributed data processing system 10 according to the present embodiment. The data processing system 10 may be constituted by a data center (a center server) 100, edge servers 200, and vehicles 300. The data center 100 and the edge servers 200 may be connected to each other by wired communication, wireless communication, or both wired and wireless communication, and the edge servers 200 and the vehicles 300 may be connected to each other by wireless communication. In addition, the vehicles 300 may also be connected to each other by wireless communication. The numbers of the respective apparatuses shown in FIG. 1 are purely exemplary and the numbers thereof are not particularly limited.

The data processing system 10 according to the present embodiment may issue an information request from the data center 100 to the vehicles 300 via the edge servers 200. The information request may include an attribute of necessary data. The information request may also be referred to as subscribe information and, in the present disclosure, may also be referred to as SUB information or simply as SUB.

In the present embodiment, the vehicle 300 may include a laser scanner (LIDAR) and be capable of acquiring point group data by a laser scanner measurement. In order to acquire point group data of a specific area, the data center 100 may issue an information request including a target area (location) as an attribute. The information request may be distributed to the vehicle 300 via the edge server 200. The vehicle 300 may receive the information request and generate data, and perform data transmission to the edge server 200.

The edge server 200 may notify the center server 100 of an information possession notification expressing the fact that requested data is in possession. The information possession notification may also be referred to as publish information and, in the present disclosure, may also be referred to as PUB information or simply as PUB. Moreover, the edge server 200 may be configured to notify the data center 100 of the information possession notification after integrating a prescribed number of pieces of data having a same attribute.

When the data center 100 receives an information possession notification from the edge server 200, the data center 100 may issue a cancellation request which cancels the request for the information and distribute the cancellation request to the edge server 200 and to the vehicle 300 via the edge server 200. The cancellation request may indicate that collection of information having a specified attribute is no longer necessary. Implementation of the cancellation request is not limited to a specific form as long as the information for which a request is canceled can be identified. For example, a message including an attribute of the information for which a request is canceled may be transmitted separately from an information request. Alternatively, the attribute of the information for which a request is canceled may be deleted from a previous information request and an updated information request may be transmitted. Instead of completely deleting the canceled attribute, a deletion flag may be set so that the deletion of the canceled attribute can be recognized.

When the edge server 200 receives a cancellation request, the edge server 200 may delete specified information from the information request and thereafter transmit an updated information request to the vehicle 300. Upon receiving the cancellation request, the vehicle 300 may suspend collection of the specified information. In addition, when the vehicle 300 possesses information specified in the cancellation request, the vehicle 300 may discard the information. Discarding information may include preventing the information from occupying a storage apparatus.

Moreover, the distribution of an information request, the acquisition and transmission of data, the distribution of an information possession notification, and the distribution of a cancellation request may be performed in a similar manner to that described earlier by vehicle-to-vehicle communication among the vehicles 300. In this case, which of the vehicles is positioned upstream and downstream may be determined according to a prescribed criterion among the vehicles. Then, the information request and the cancellation request may be transmitted from a vehicle on the upstream side to a vehicle on a downstream side, and requested data may be transmitted from a vehicle on the downstream side to a vehicle on the upstream side. In this case, upstream and downstream may be determined using a "closeness" between the vehicle 300 and the edge server 200 as a criterion. Besides physical closeness, the "closeness" can be determined based on the number of hops, communication opportunities, the time required until communication is established, or the like.

As described above, the edge server 200 and the vehicle 300 can promote discarding of unnecessary information by retaining non-necessity information and distributing the non-necessity information to other vehicles 300. In addition, by collecting and integrating a plurality of pieces of information having a requested attribute, the edge server 200 and the vehicle 300 can enhance the value of information and, at the same time, suppress data capacity. Accordingly, processing by the data center 100 can be distributed.

<Configuration>

The data center 100 and the edge server 200 can be realized by a computer. The data center 100 and the edge server 200 are configured as a general computer (information processing apparatus) which may be constructed so as to include: a processor (processing unit) such as a central processing unit (CPU) or a micro processing unit (MPU); a main storage apparatus such as a random access memory (RAM); an auxiliary storage apparatus such as a semiconductor memory, a magnetic disk, an optical disk, and a magneto-optical disk; an input apparatus such as a keyboard, various pointing devices (a mouse, a touch pad, a touch panel, a pen tablet, or the like), and a microphone; an output apparatus such as a display apparatus (a liquid crystal display, a CRT display, a projector, or the like) and a voice output apparatus; and a communication apparatus for performing wired communication and wireless communication. The data center 100 and the edge server 200 provide the respective functions described below as the processor deploys a computer program stored in the auxiliary storage apparatus onto the main storage apparatus and executes the computer program. However, a part of or all of the functions described below may be realized using a logic circuit such as an application specific integrated circuit (ASIC), a field programmable gate array (FPGA), or a digital signal processor (DSP). In addition, the data center 100 and the edge server 200 need not necessarily be configured as a single computer and functions thereof may be provided through the cooperation of a plurality of computers.

As a result of the processor executing the program, the data center 100 functions as an information request (SUB) issuing/updating unit 110, an information request (SUB) transmitting unit 120, a possession information (PUB) receiving unit 130, and a storage unit 140.

As a result of the processor executing the program, the edge server 200 functions as an information request (SUB) receiving unit 210, an information request (SUB) transmitting unit 220, an information receiving unit 230, a storage unit 240, a data integrating unit 250, and a possession information (PUB) transmitting unit 260.

The vehicle 300 is configured so as to include a computer (a vehicle-mounted terminal). Since a configuration itself of the computer is similar to the configuration described above, a repetitive description will be omitted. The vehicle-mounted terminal is capable of acquiring measurement data of a vehicle-mounted sensor (such as LIDAR 340) and accessing an intra-vehicular network to acquire control information and navigation information of the vehicle. In addition, the vehicle-mounted terminal is capable of communicating with the edge server 200 or other vehicles 300 via a wireless communication apparatus. A wireless communication system is not particularly limited and an arbitrary system such as WiFi, Long Term Evolution (LTE), and dedicated short range communication (DSRC) can be adopted. The wireless communication system used with the edge server 200 and the wireless communication system used with other vehicles 300 may be the same or may differ from each other.

As a result of a processor of the vehicle-mounted terminal executing a program, the vehicle 300 functions as an information request (SUB) receiving unit 310, an information request (SUB) transmitting unit 320, and an information transmitting unit 330.

<Processing>

Figure 3:
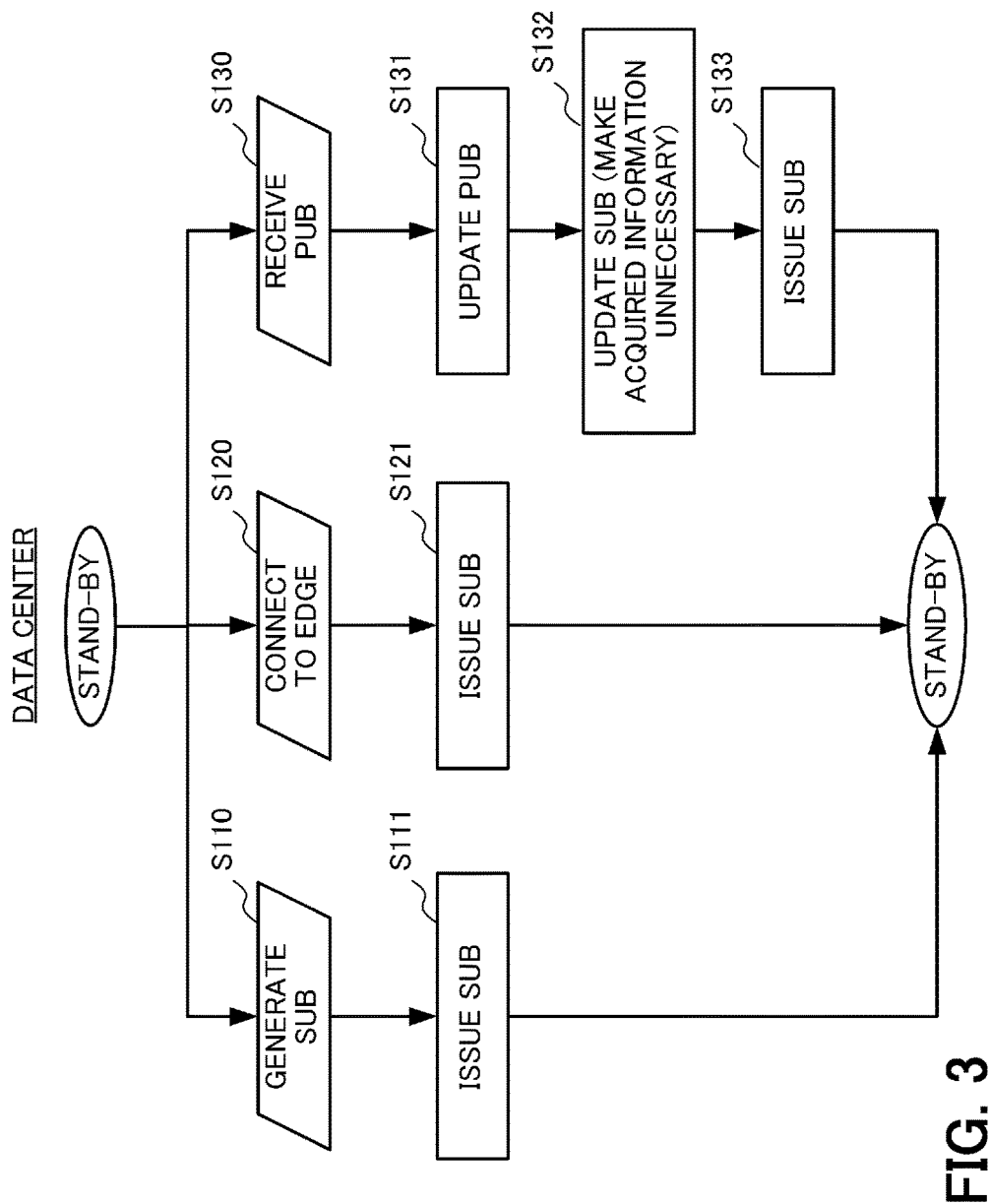
FIG. 3 is a flow chart showing processing by a data center (a center server)

Processing performed by the data center 100 will be described with reference to FIG. 3.

When the SUB issuing/updating unit 110 generates an information request (S110), the data center 100 transmits the information request to the edge server 200 to which the SUB transmitting unit 120 is being connected (S111). As will be described later, by transmitting an information request to the edge server 200, the information request can be distributed to the entire data processing system 10 including the vehicles 300.

For example, an information request may be generated based on an instruction given from the outside such as a user input or may be generated in accordance with a schedule or a rule determined in advance. In the present embodiment, for example, a generated information request describes that measurement information of a LIDAR sensor at a specific area (location) is required. Here, a single information request may include a plurality pieces of attribute information to express that a plurality of pieces of information (for example, data of location A and data of location B) are necessary. The data center 100 stores the generated information request in the storage unit 140.

When the data center 100 is connected to a new edge server 200 (S120), the SUB transmitting unit 120 may transmit the information request stored in the storage unit 140 to the new edge server 200 (S121).

When the PUB receiving unit 130 of the data center 100 receives a possession information notification from the edge server 200 (S130), possession information in the storage unit 140 may be updated according to the received possession information notification (S131). Specifically, the possession information in the storage unit 140 may be updated so as to express that information having the attribute specified in the possession information notification is in the possession of the edge server 200 that is a transmission source. Accordingly, a determination can be made as to which edge server 200 should be accessed when information having the attribute becomes necessary. Obviously, the sensor data itself may be received from the edge server 200 and stored in the storage unit 140.

In addition, the SUB issuing/updating unit 110 also may update the information request in the storage unit 140 (S132). Specifically, the information request may be updated so as to indicate that the information specified in the possession information notification (the information having been requested in the information request) need no longer be collected. As an example, a flag indicating that collection of the information is unnecessary may conceivably be set in an information request. Accordingly, the fact that information having a given attributed had been previously requested and the fact that acquisition of the information is currently unnecessary can be recognized. As another example, the information may conceivably be deleted in an information request. Even in this case, which piece of information had become unnecessary can be recognized based on a difference between information requests. In the present embodiment, an updated information request corresponds to non-necessity information or a cancellation notification.

Once an information request is updated, the SUB transmitting unit 120 may transmit the updated information request to the edge server 200 (S133). Accordingly, the updated information request can be distributed to the entire data processing system 10 including the vehicles 300.

Next, processing by the edge server 200 will be described with reference to FIG. 4.

When the SUB receiving unit 210 of the edge server 200 receives an information request from the SUB transmitting unit 120 of the data center 100 (S210), the information request may be stored or updated in the storage unit 240 (S211).

In doing so, when there is information that has become unnecessary in a newly received information request and information having an attribute thereof is stored in the storage unit 240, the SUB receiving unit 210 may delete the information from the storage unit 240 (S212). Which piece of information has become unnecessary can be determined solely based on the newly received information request when a non-necessity flag is used in the information request. When a non-necessity flag is not used, the new information request can be compared with the information request in the storage unit 240 and information not included in the new information request can be determined as the information that has become unnecessary.

When the edge server 200 becomes capable of communicating with the vehicle 300 (S220), the SUB transmitting unit 120 transmits (issues) the information request in the storage unit 240 to the vehicle 300 (S221).

When the vehicle 300 possesses the information being requested in the information request, the vehicle 300 transmits the requested information to the edge server 200 (processing by the vehicle 300 will be described later). When the information receiving unit 230 of the edge server 200 receives the information from the vehicle 300 (S222: YES), the information receiving unit 230 stores the received information in the storage unit 240 (S223). In addition, the information receiving unit 230 may update the information request stored in the storage unit 240 (S224). Specifically, information having the attribute acquired from the vehicle 300 may be made unnecessary. While there are a plurality of methods of expressing non-necessity information as described earlier, a consistent method may be desirably adopted throughout the data processing system 10. Furthermore, the PUB transmitting unit 260 may transmit a possession information notification for notifying the fact that information acquired from the vehicle 300 is in possession to the data center 100 (S225).

Figure 4:
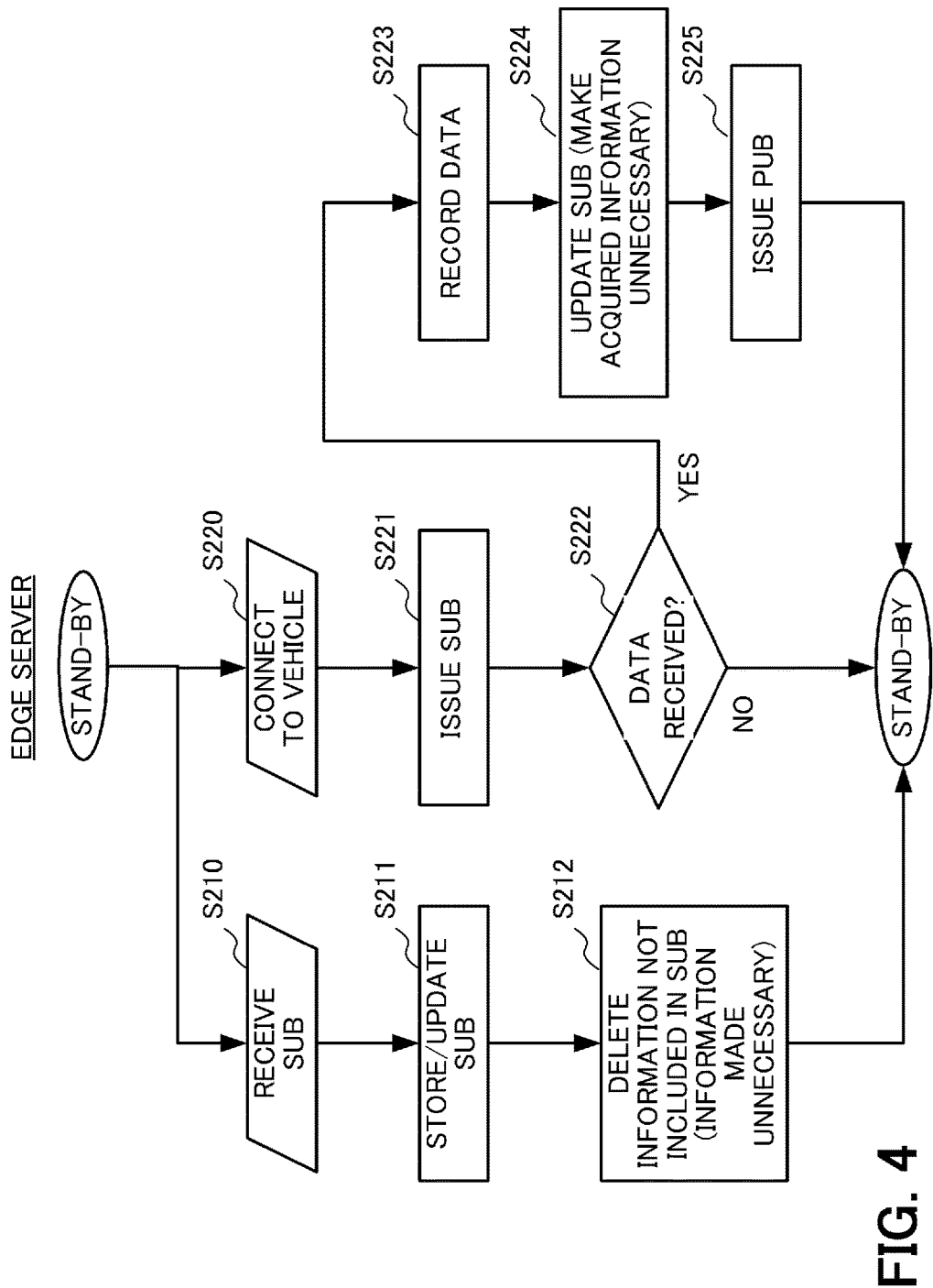
FIG. 4 is a flow chart showing processing by an edge server.

While the flow chart of FIG. 4 shows that the requested data is made unnecessary and a possession notification is issued immediately upon receiving data from the vehicle 300, the requested data may be made unnecessary and a possession notification may be issued after the acquisition of a certain number of pieces of data. A plurality of pieces of data can be integrated by performing statistical processing with the data integrating unit 250. Since information handled in the present embodiment is point group data of LIDAR, the data integrating unit 250 can integrate a plurality of pieces of point group data using a voxel grid filter. A voxel grid filter is to divide a three-dimensional space into appropriate voxels (for example, a cube with 6 cm-side) and to approximate points existed in each voxel by the centroid of the points inside the voxel. A voxel grid filter enables a data amount to be suppressed and improves reliability of data by suppressing variations in measurement.

The number of pieces of data required to make data unnecessary and to issue a possession notification may be set in advance in the entire system or may be included in an information request generated by the data center 100.

Figure 5:
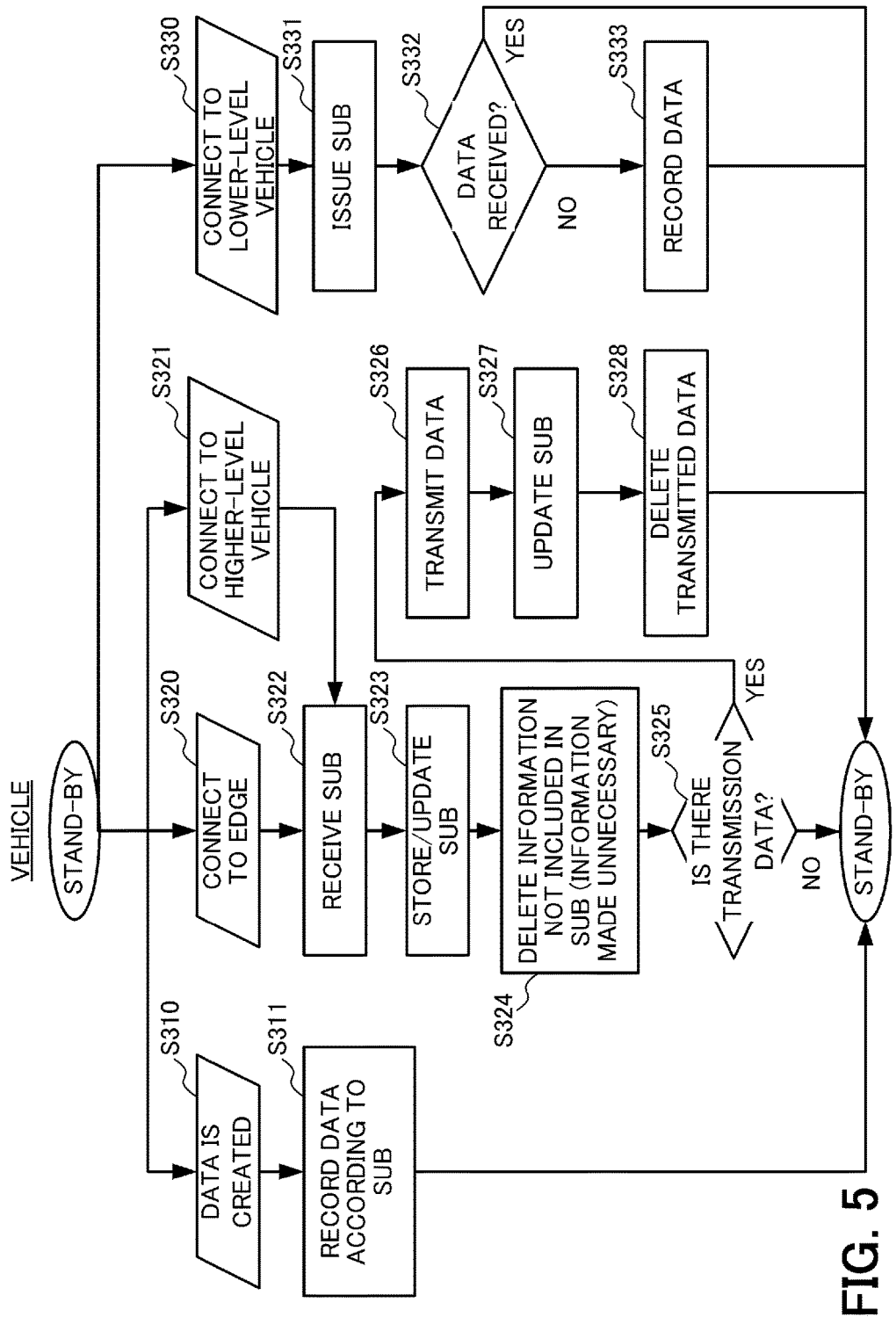
FIG. 5 is a flow chart showing processing by a vehicle (a vehicle-mounted terminal)

Next, processing performed by the vehicle 300 will be described with reference to FIG. 5.

When the LIDAR 340 performs a measurement and data is created (S310), the data is stored in a storage unit (not shown) in accordance with an information request (S311). Moreover, the LIDAR 340 may only perform a measurement and store measurement data at a location for which information is requested in an information request currently being stored. Alternatively, the LIDAR 340 may continuously perform measurements and store measurement data at a location being requested in an information request currently being stored.

When the vehicle 300 connects to the edge server 200 and becomes capable of communication (S320), the SUB receiving unit 310 of the vehicle 300 receives an information request from the SUB transmitting unit 220 of the edge server 200 (S322). The SUB receiving unit 310 stores or updates the information request in the storage unit (not shown) (S323).

In doing so, when there is information that has become unnecessary in a newly received information request and information having an attribute thereof is stored in the storage unit, the SUB receiving unit 310 deletes the information from the storage unit (S324). Which piece of information has become unnecessary can be determined solely based on the newly received information request when a non-necessity flag is used in the information request. When a non-necessity flag is not used, the new information request can be compared with the information request in the storage unit and information not included in the new information request can be determined as the information that has become unnecessary.

When the vehicle 300 possesses information being requested in the information request of the edge server 200 to which the vehicle 300 is currently being connected, the vehicle 300 can determine that the vehicle 300 possesses transmission data to the edge server 200 (S325: YES). In this case, the information transmitting unit 330 transmits the information to the edge server 200 (S326) and, at the same time, updates the information request in the storage unit (S327). Specifically, information transmitted to the edge server 200 is made unnecessary. In addition, transmitted data is deleted from the storage unit (S328). Although making information unnecessary or deleting information is not essential at the time of data transmission since non-necessity information is to be subsequently distributed from the data center, information is desirably made unnecessary and deleted at this time point in order to improve processing efficiency and memory use efficiency.

When the vehicle 300 connects to a higher-level vehicle (S321), processing of steps S322 to S328 is executed in a similar manner to that described above. However, in this case, the communication partner is the higher-level vehicle instead of the edge server 200.

A simple description of a higher level (upstream) and a lower level (downstream) among vehicles will now be given. In the present embodiment, upstream and downstream with respect to vehicles may be determined in accordance with a prescribed criterion in order to provide a hierarchical structure among the vehicles. For example, as described in Japanese Patent Application Laid-open No. 2016-76911, a method can be adopted in which assessment values based on communication opportunities with the edge server 200 are respectively calculated and a vehicle with a high assessment value (assumed to have many communication opportunities with the edge server 200) is considered to be on the upstream side. As the assessment value, for example, a physical distance to the edge server 200, the number of hops, and a communication-enabled time, the number of communications, an amount of communicated data or the like with the edge server 200 within a previous prescribed period can be adopted. In this manner, by transmitting data to a vehicle that is assumed to have many communication opportunities with the edge server 200, a probability of data reaching the edge server 200 and further reaching the data center 100 can be improved.

In addition, when transmitting data from the vehicle 300 to the edge server 200, data may be transmitted to the edge server 200 after integrating a plurality of pieces of data having a same attribute in a similar manner to that described in regards to the processing by the edge server 200. This processing is effective when the vehicle 300 is capable of acquiring pieces of data having the same attribute (data at a same position) a plurality of times in a short period of time.

Operation Example

Hereinafter, processing by the data processing system 10 will be described based on a specific operation example with reference to FIGS. 6 to 13. FIGS. 6 to 13 show, as necessary, the data center 100, the edge server 200, and the vehicle 300 among the configuration of the data processing system 10. Since the edge server 200 and the vehicle 300 exist in plurality in the system, reference will be made to edge servers 200a and 200b, vehicles 300a and 300b, and the like when distinctions need to be made.

Figure 6:
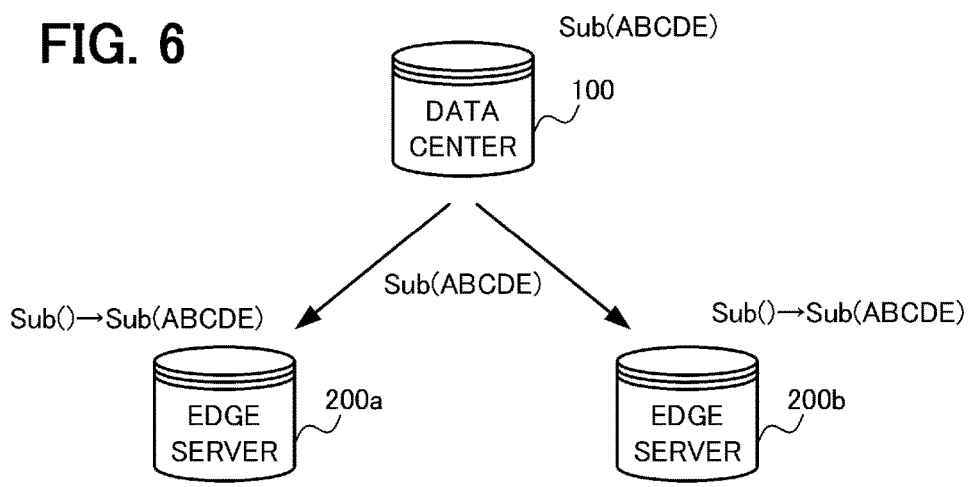
FIG. 6 is a diagram illustrating an operation example of multi-stage distributed data processing according to an embodiment.

FIG. 6 shows processing when an information request is newly generated in the data center 100. In FIG. 6, the information request is expressed as Sub(ABCDE). This means that a request is made for information having at least any of an attribute A, an attribute B, an attribute C, an attribute D, and an attribute E. In the present embodiment, each attribute may represent a location.

The data center 100 transmits the newly generated information request Sub(ABCDE) to the communicatively connected edge servers 200a and 200b (S111). The edge server 200 receives the information request and updates an information request in the storage unit (S211). Moreover, in the diagram, the information request Sub( ) stored in the storage unit indicates that there is no information being requested.

Figure 7:
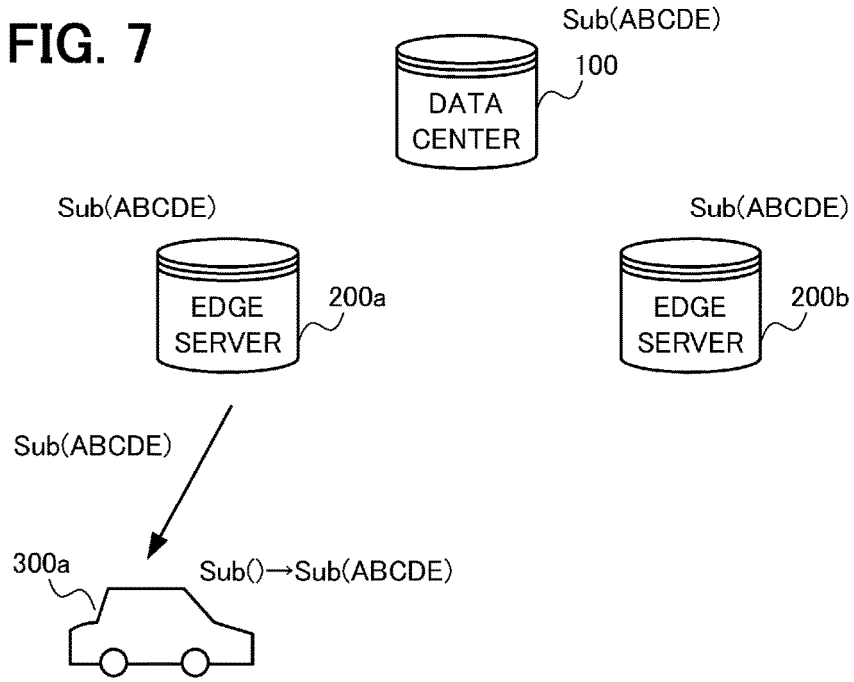
FIG. 7 is a diagram illustrating an operation example of multi-stage distributed data processing according to an embodiment.

FIG. 7 shows processing when the edge server 200a becomes capable of communicating with the vehicle 300a. When the edge server 200a becomes capable of communicating with the vehicle 300a, the edge server 200a transmits the information request Sub(ABCDE) stored in the storage unit to the vehicle 300a (S221). The vehicle 300a receives the information request (S322) and updates an information request in the storage unit (S323). In this case, it is assumed that the vehicle 300a does not possess information having any of the attributes A, B, C, D, and E and, therefore, there is no data to be transmitted from the vehicle 300a to the edge server 200a (S325: NO and S222: NO).

Figure 8:
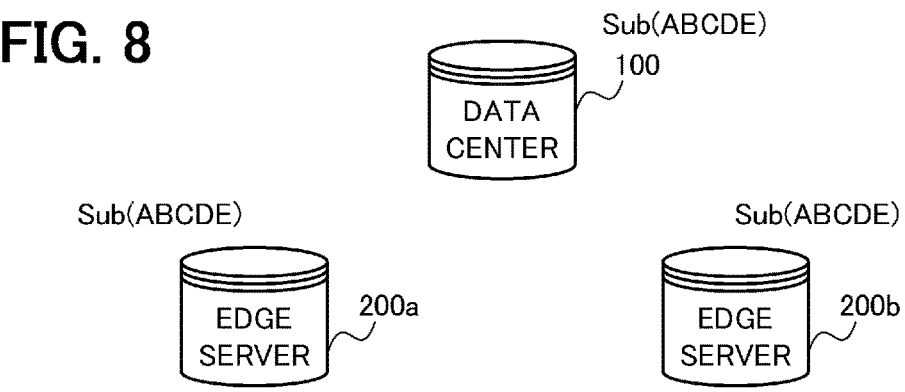
FIG. 8 is a diagram illustrating an operation example of multi-stage distributed data processing according to an embodiment.

FIG. 8 shows processing when the vehicle 300a becomes capable of communicating with another vehicle 300b. When the vehicle 300a and the vehicle 300b become capable of communicating with each other, the vehicles exchange assessment values representing communication opportunities with the edge server 200 with each other and determine which vehicle is upstream (higher level) and which vehicle is downstream (lower level). In this case, it is assumed that the vehicle 300a is determined to be upstream and the vehicle 300b is determined to be downstream.

The vehicle 300a transmits the information request Sub (ABCDE) stored in the storage unit to the vehicle 300b which is a lower-level vehicle (S331). The vehicle 300b receives the information request from the vehicle 300a which is a higher-level vehicle (S322) and updates an information request in the storage unit (S323). In this case, it is assumed that the vehicle 300b does not possess information having any of the attributes A, B, C, D, and E and, therefore, there is no data to be transmitted from the vehicle 300b to the vehicle 300a (S325: NO and S332: NO).

Figure 9:
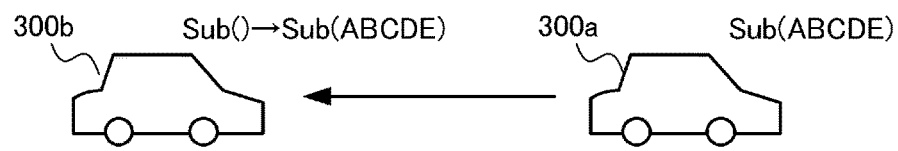
FIG. 9 is a diagram illustrating an operation example of multi-stage distributed data processing according to an embodiment.
Figure 9:
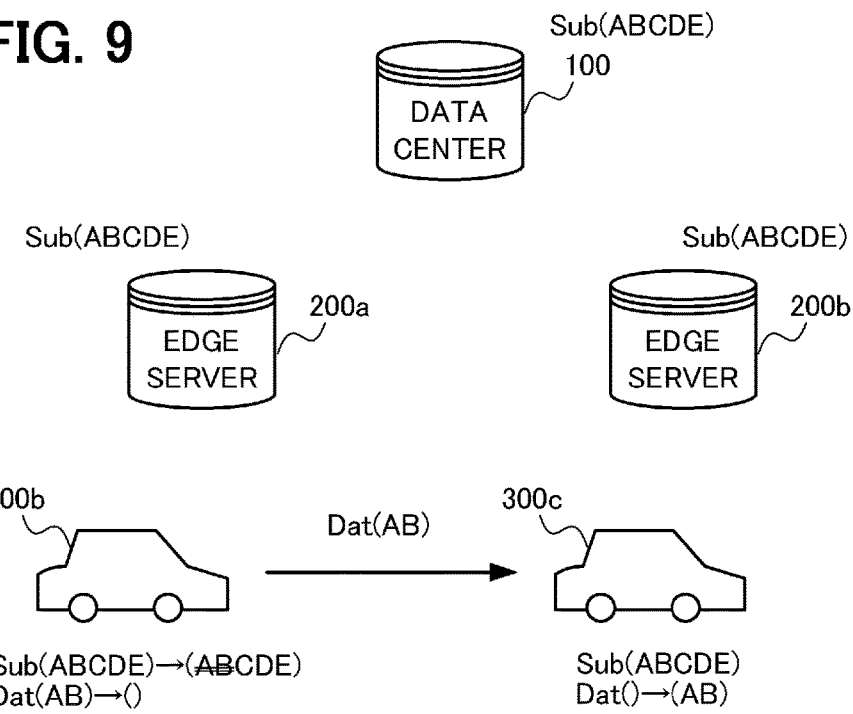

FIG. 9 shows processing when the vehicle 300b becomes capable of communicating with another vehicle 300c. It is assumed that, after receiving the information request Sub (ABCDE) from the vehicle 300a, the vehicle 300b has acquired information having the attribute A and information having the attribute B. Dat(AB) in the diagram represents data including information having the attribute A and information having the attribute B.

It is assumed that assessment values have been exchanged between the vehicle 300b and the vehicle 300c, and the vehicle 300c is determined to be upstream and the vehicle 300b is determined to be downstream. In this case, although the information request Sub(ABCDE) is transmitted from the vehicle 300c to the vehicle 300b in a similar manner to FIG. 8, this transmission is omitted in FIG. 9. Since the vehicle 300b already stores the information request Sub (ABCDE), no change is made to the information request in the storage unit even when the information request Sub (ABCDE) is received from the vehicle 300c.

Since the vehicle 300b receives the information request Sub(ABCDE) from the vehicle 300c and the vehicle 300b possesses data with the attribute A and data with the attribute B, the vehicle 300b makes a determination to transmit these pieces of data to the vehicle 300c (S325: YES). The vehicle 300b transmits data Dat(AB) to the vehicle 300c (S326). In addition, the vehicle 300b updates the information request Sub(ABCDE) in the storage unit and deletes a request related to the attribute A and the attribute B (makes a request related to the attribute A and the attribute B unnecessary) (S327). Since the request related to the attribute A and the attribute B are deleted (made unnecessary), the information request stored by the vehicle 300b is changed to an information request Sub(CDE) requesting the attribute C, the attribute D, and the attribute E. Furthermore, the vehicle 300b deletes the data Dat(AB) with the attribute A and the attribute B transmitted to the vehicle 300c from the storage unit (S328). At this point, there is no measurement data stored by the vehicle 300b (expressed as Dat ( )).

When the vehicle 300c receives the data Dat(AB) from the vehicle 300b, the vehicle 300c stores the data in the storage unit (S333). In this case, it is assumed that the vehicle 300c had not possessed measurement data prior to communicating with the vehicle 300b. Therefore, the data Dat(AB) received from the vehicle 300b becomes the data in the possession of the vehicle 300c.

Figure 10:
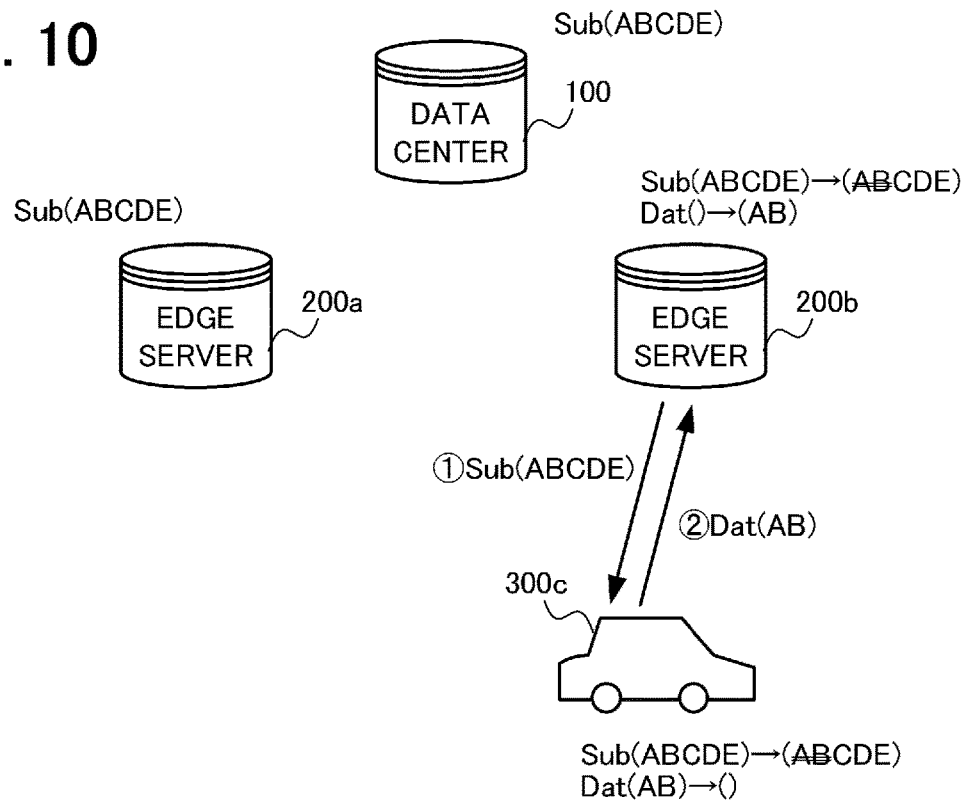
FIG. 10 is a diagram illustrating an operation example of multi-stage distributed data processing according to an embodiment.

FIG. 10 shows processing when the vehicle 300c becomes capable of communicating with the edge server 200b. First, in a similar manner to FIG. 7, the information request Sub(ABCDE) is transmitted from the edge server 200b to the vehicle 300c.

Since the vehicle 300c receives the information request Sub(ABCDE) from the edge server 200b and the vehicle 300c possesses data with the attribute A and data with the attribute B, the vehicle 300c makes a determination to transmit these pieces of data to the edge server 200b (S325: YES). The vehicle 300c transmits the data Dat(AB) to the edge server 200b (S326), updates the information request (S327), and deletes possessed data (S328). These processes are similar to the processes described with reference to FIG. 9 with the exception of the edge server 200b being a destination.

Figure 11:
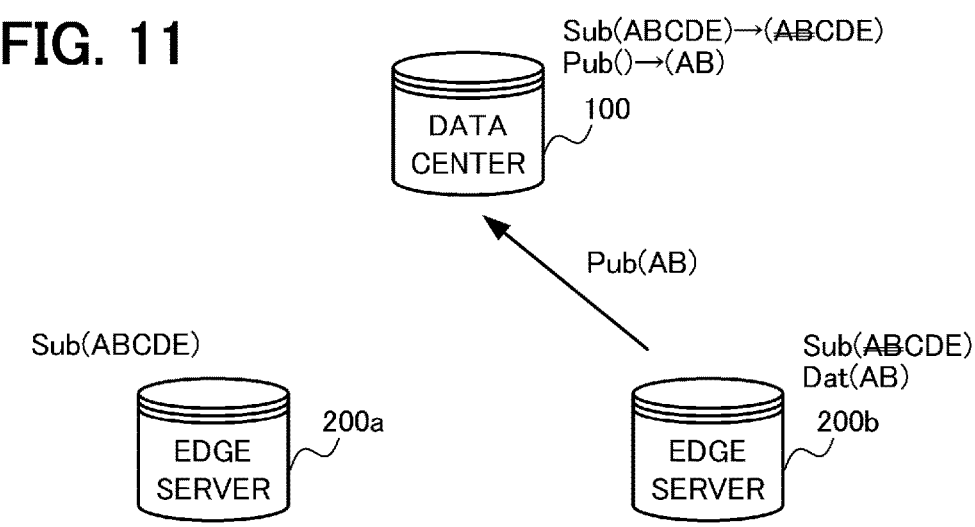
FIG. 11 is a diagram illustrating an operation example of multi-stage distributed data processing according to an embodiment.

FIG. 11 shows processing performed by the edge server 200b and the data center 100 after receiving the data Dat(AB) from the vehicle 300c.

When the edge server 200b receives the data Dat(AB) from the vehicle 300c, the edge server 200b stores the data in the storage unit (S223). In addition, the edge server 200b updates the information request Sub(ABCDE) in the storage unit and deletes a request related to the attribute A and the attribute B (makes a request related to the attribute A and the attribute B unnecessary) (S224). The edge server 200b further transmits possession information Pub(AB) indicating that data with the attribute A and data with the attribute B are in possession to the data center 100 (S225).

A description has been given on the assumption that an integration process of data is not performed by the edge server 200. When an integration process is necessary, processes subsequent to updating an information request may be performed after integrating a prescribed number of pieces of data having a specific attribute.

Upon receiving the possession information Pub(AB) from the edge server 200b, the data center 100 updates possession information in the storage unit (S131). Specifically, the already stored possession information is updated by adding the attribute A and the attribute B thereto. The data center 100 further updates the information request based on the possession information from the edge server 200b (S131). Specifically, information with the attribute A and the attribute B included in the possession information Pub(AB) is deleted (made unnecessary) from the information request Sub(ABCDE). Accordingly, the information request in the possession of the data center 100 becomes Sub(CDE) (however, the information request may be stored so as to remind that A and B have been deleted).

Figure 12:
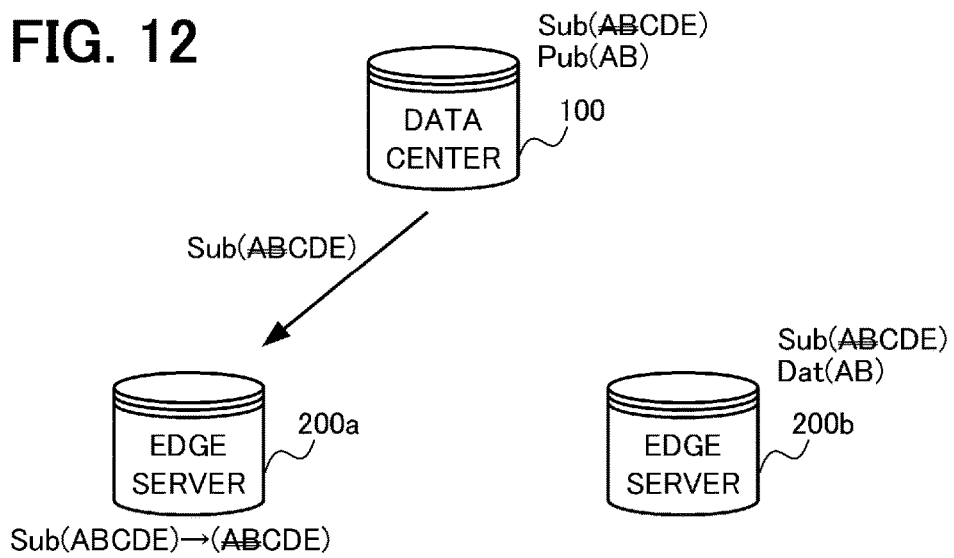
FIG. 12 is a diagram illustrating an operation example of multi-stage distributed data processing according to an embodiment.

FIG. 12 shows processing accompanying the update of possession information in the data center 100. When an information request is updated in accordance with the reception of possession information from the edge server 200b, the data center 100 transmits the updated information request Sub(CDE) to the edge server 200 (S111). While the diagram shows the information request being transmitted only to the edge server 200a, the information request may also be transmitted to the edge server 200b.

Based on the newly received information request, the edge server 200a updates the information request in the storage unit (S211). Due to the fact that the attribute A and the attribute B are made unnecessary in the information request transmitted from the center server 100 or, based on a difference between the received information request and the stored information request, it is evident that data with the attribute A and the attribute B need no longer be collected. In consideration thereof, the edge server 200a deletes the attribute A and the attribute B from the stored information request and the information request in the storage unit becomes Sub(CDE). At this point, when the edge server 200a stores measurement data of the attribute A and the attribute B in the storage unit, the measurement data may be deleted (S212). However, the data to be deleted is other than the data having notified the data center 100 of the possession information Pub(AB).

Figure 13:
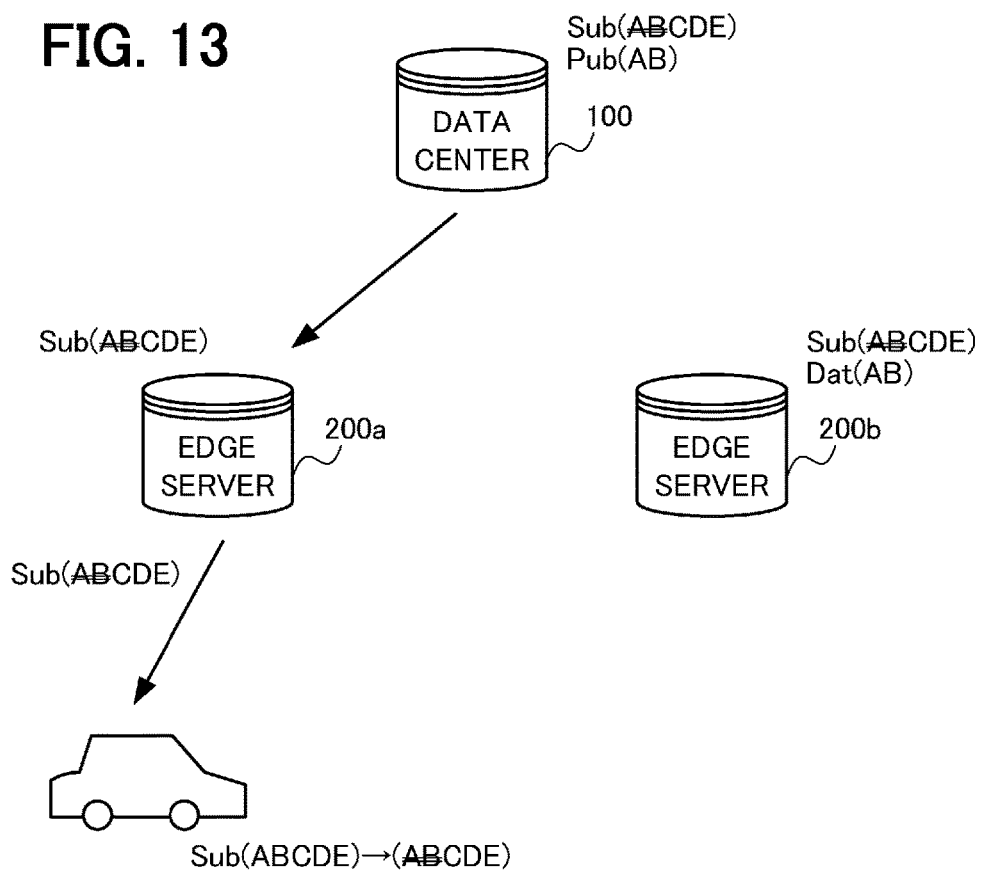
FIG. 13 is a diagram illustrating an operation example of multi-stage distributed data processing according to an embodiment.

FIG. 13 represents transmission of the information request from the edge server 200a to a vehicle 300d. When the edge server 200a becomes capable of communicating with the vehicle 300d, the edge server 200a transmits the updated information request Sub(CDE) to the vehicle 300d. In the vehicle 300d, in a similar manner to the edge server 200 described above, an information request is updated (S323) and data related to the deleted request (the request made unnecessary) is deleted (S324).

Moreover, when the vehicle 300d becomes capable of communicating with another vehicle 300 and the vehicle 300d is determined to be upstream, the vehicle 300d transmits the updated information request Sub(CDE) to the other vehicle 300. Processing when receiving an updated information request from another vehicle is similar to when receiving an updated information request from an edge server.

Advantageous Effects of the Present Embodiment

According to the present embodiment, necessary information can be swiftly collected using vehicles and collection of information that has become available to a data center can be swiftly suspended. As a result, efficient information collection can be achieved.

In addition, when performing an integration process of data in an edge server, data quality can be improved while suppressing a data amount. While adding the integration process increases the period of time until data becomes available to the data center, there is an advantage that data with higher quality can be used. Furthermore, since the process is performed in an edge server, a load on a center server can be distributed.

<Modifications>

The embodiment described above merely represents an example and the present invention can be implemented with various modifications without departing from the spirit and scope of the invention.

While an example in which point group data obtained by a laser scanner (LIDAR) is collected in order to generate a three-dimensional map has been described in the embodiment presented above, it should be obvious that types of data to be collected are not particularly limited. Nevertheless, when a capacity of a single piece of data is large, effects of improving communication efficiency and reducing memory capacity are also large.

In the embodiment described above, in order to notify an edge server or a vehicle of information which need no longer be collected, an information request from which an attribute of the unnecessary information has been deleted or an information request in which a deletion flag is set to the attribute of the unnecessary information is transmitted from a data center. However, only an attribute of information which need no longer be collected may be transmitted from the data center to an edge server or a vehicle. The embodiment described earlier can be considered an embodiment in which an information request also functions as non-necessity information, while the modification currently being described can be considered an embodiment in which an information request and non-necessity information differ from each other.

In the embodiment described above, a vehicle-mounted terminal being mounted to a vehicle is used as a mobile terminal which collects information and transmits the information to an edge server. However, it is to be understood that, in addition to a vehicle-mounted terminal, any mobile terminal can be adopted as long as the mobile terminal is capable of movement and acquiring information. For example, a terminal mounted to an aircraft or a ship in addition to a vehicle or a terminal that can be carried around by a user can be adopted. In addition, a vehicle-mounted terminal includes a terminal mounted to an autonomous vehicle.

This application claims the benefit of Japanese Patent Application No. 2016-236724, filed on Dec. 6, 2016, which is hereby incorporated by reference herein in its entirety.

What is claimed is:

1. A distributed data processing system comprising a center server, a plurality of edge servers, and a mobile terminal, and collecting, in the center server, data acquired by the mobile terminal, wherein
   the center server is adapted to distribute an information request describing an attribute of at least one piece of necessary data to the mobile terminal via an edge server,
   the mobile terminal is adapted to transmit requested data, which is data having the attribute in the information request, to the edge server,
   the edge server is adapted to send, in response to receiving the requested data, a notification to the center server without forwarding the requested data to the center server, the notification indicating that the edge server is in possession of the requested data,
   the center server is adapted to distribute, in response to receiving the notification from the edge server indicating that the edge server is in possession of the requested data and without having received the requested data, non-necessity information to the edge server and to the mobile terminal via the edge server, the non-necessity information indicating that collection of unnecessary data, which includes at least the requested data, is unnecessary, and
   the mobile terminal is adapted to, when the mobile terminal receives the non-necessity information, suspend acquisition of the unnecessary data indicated in the non-necessity information, and to discard the unnecessary data if the unnecessary data is stored in the mobile terminal.

2. The distributed data processing system according to claim 1, wherein after the edge server acquires and integrates a prescribed number of pieces of data having an attribute deemed necessary in the information request, the edge server notifies the center server to the effect that the requested data has been acquired.

3. The distributed data processing system according to claim 2, wherein the center server distributes the information request by including the prescribed number in the information request.

4. The distributed data processing system according to claim 1, wherein after the mobile terminal acquires and integrates a prescribed number of pieces of data having an attribute deemed necessary in the information request, the mobile terminal transmits the integrated data to the edge server.

5. The distributed data processing system according to claim 1, wherein the mobile terminal is adapted to:
   determine, in accordance with a prescribed criterion, which mobile terminals, from among the mobile terminal and other mobile terminals, are on the upstream side and on the downstream side respectively,
   distribute, to the other mobile terminal on the downstream side, the information request and the non-necessity information distributed from the edge server or the other mobile terminal on the upstream side, and
   when the information request is acquired from the other mobile terminal on the upstream side, transmit the requested data to the edge server or the other mobile terminal on the upstream side, and when the non-necessity information is acquired, discard the unnecessary data if the data is stored.

6. The distributed data processing system according to claim 1,
   wherein the data is point group data obtained by a laser scanner measurement, and
   wherein the information request includes a measurement position of the point group data as an attribute of necessary data.

7. An edge server collecting data from a mobile terminal in accordance with an information request from a center server, the edge server comprising:
   an information request receiving unit adapted to receive an information request describing an attribute of at least one piece of necessary data from the center server;
   an information request transmitting unit adapted to transmit the information request to the mobile terminal;
   an information receiving unit adapted to receive requested data, which is data having the attribute in the information request from the mobile terminal;
   a possession notification transmitting unit adapted to send, in response to receiving the requested data, a notification to the center server indicating that the edge server is in possession of the requested data without sending the requested data to the center server;
   a non-necessity information receiving unit adapted to receive from the center server non-necessity information sent by the center server in response to the notification indicating that the edge server is in possession of the requested data and without the center server having received the requested data, the non-necessity information indicating that collection of unnecessary data, which includes at least the requested data, is unnecessary; and
   a non-necessity information transmitting unit adapted to transmit the non-necessity information to the mobile terminal.

8. A data collection method in a distributed data processing system including a center server, a plurality of edge servers, and a mobile terminal and collecting, in the center server, data acquired by the mobile terminal, the method comprising:
   distributing, by the center server, an information request describing an attribute of at least one piece of necessary data to the mobile terminal via an edge server;
   transmitting, by the mobile terminal, requested data which is data having the attribute in the information request to the edge server;
   notifying, by the edge server and in response to receiving the requested data, the center server that the edge server is in possession of the requested data without forwarding the requested data to the center server;
   distributing, by the center server, in response to receiving the notification from the edge server indicating that the edge server is in possession of the requested data and without the center server having received the requested data, non-necessity information to the edge server and to the mobile terminal via the edge server, the non-necessity information indicating that collection of unnecessary data, which includes at least the requested data, is unnecessary; and in response to receiving the non-necessity information, suspending, by the mobile terminal, acquisition of unnecessary data, of which collection is deemed unnecessary in the non-necessity information, and discard the data if the data is stored.

9. The data collection method according to claim 8, wherein, in the step of notifying, the edge server notifies the center server to the effect that the requested data has been acquired after the edge server acquires and integrates a prescribed number of pieces of data having an attribute deemed necessary in the information request.

10. The data collection method according to claim 9, wherein in the step of distribution of an information request, the center server distributes the information request by including the prescribed number in the information request.

11. The data collection method according to claim 8, wherein the step of transmitting the requested data includes acquiring and integrating a prescribed number of pieces of data having an attribute deemed necessary in the information request, and transmitting the integrated data to the edge server.

12. The data collection method according to claim 8, further comprising:

determining, by the mobile terminal, in accordance with a prescribed criterion, which mobile terminals, from among the mobile terminal and other mobile terminals, are on the upstream side and on the downstream side respectively;

distributing, by the mobile terminal, to the other mobile terminal on the downstream side, the information request and the non-necessity information distributed from the edge server or the other mobile terminal on the upstream side; and transmitting, by the mobile terminal, when the information request is acquired from the other mobile terminal on the upstream side, requested data which is requested in the information request to the edge server or the other mobile terminal on the upstream side, and when the non-necessity information is acquired, discarding the unnecessary data if the data is stored.

13. The data collection method according to claim 8, wherein the data is point group data obtained by a laser scanner measurement, and wherein the information request includes a measurement position of the point group data as an attribute of necessary data.

* * * * *